United States Patent
Lee et al.

(10) Patent No.: US 9,223,882 B2
(45) Date of Patent: Dec. 29, 2015

(54) METHOD, APPARATUS, AND RECORDING MEDIUM FOR SELECTING LOCATION OF MOBILE DEVICE

(75) Inventors: Yu-Cheng Lee, Taoyuan County (TW); John C. Wang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 855 days.

(21) Appl. No.: 12/689,231

(22) Filed: Jan. 19, 2010

(65) Prior Publication Data

US 2010/0185391 A1    Jul. 22, 2010

(30) Foreign Application Priority Data

Jan. 21, 2009    (TW) .............................. 98102325 A

(51) Int. Cl.
*G01C 21/30* (2006.01)
*G06F 17/30* (2006.01)
*G01C 21/26* (2006.01)

(52) U.S. Cl.
CPC ............ *G06F 17/3087* (2013.01); *G01C 21/26* (2013.01)

(58) Field of Classification Search
None
See application file for complete search history.

(56) References Cited

U.S. PATENT DOCUMENTS

| | | | | |
|---|---|---|---|---|
| 6,606,033 | B1 * | 8/2003 | Crocker et al. | 340/901 |
| 8,000,726 | B2 * | 8/2011 | Altman et al. | 455/456.3 |
| 8,090,389 | B2 * | 1/2012 | Tysowski | 455/457 |
| 8,156,206 | B2 * | 4/2012 | Kiley et al. | 709/220 |
| 8,166,083 | B2 * | 4/2012 | Boudreau et al. | 707/920 |
| 2005/0041015 | A1 | 2/2005 | Kohda et al. | |
| 2008/0189360 | A1 * | 8/2008 | Kiley et al. | 709/203 |
| 2008/0268876 | A1 * | 10/2008 | Gelfand et al. | 455/457 |
| 2009/0138353 | A1 * | 5/2009 | Mendelson | 705/14 |
| 2009/0181699 | A1 * | 7/2009 | Tysowski | 455/457 |
| 2010/0161720 | A1 * | 6/2010 | Colligan et al. | 709/203 |

FOREIGN PATENT DOCUMENTS

| | | |
|---|---|---|
| CN | 101325750 | 12/2008 |
| CN | 101349567 | 1/2009 |
| TW | 200704108 | 1/2007 |
| TW | I287389 | 9/2007 |
| WO | 9717623 | 5/1997 |

OTHER PUBLICATIONS

"Office Action of Europe counterpart application", issued on Jun. 23, 2010, p. 1-p. 4.
"Search report of Europe counterpart application", issued on Jun. 8, 2010, p. 1-p. 3.
"Office Action of Taiwan Counterpart Application", issued on Apr. 26, 2012, p. 1-p. 7.
"First Office Action of China counterpart application" issued on May 17, 2012, p. 1-p. 7.

(Continued)

*Primary Examiner* — Ryan Zeender
*Assistant Examiner* — Christopher Buchanan
(74) *Attorney, Agent, or Firm* — Jianq Chyun IP Office

(57) ABSTRACT

A method, an apparatus, and a recording medium for selecting a location are provided. The present method uses a communication module to position a mobile device so as to get a first location of the mobile device. Then, an electronic map of a range around the first location is displayed. A second location selected on the electronic map by a user is received and used as location information. Accordingly, the user can select precise location of himself/herself in an indoor place and share the location information to remote contacts.

10 Claims, 6 Drawing Sheets

(56) References Cited

OTHER PUBLICATIONS

Anonymous, "Re: Sending Link with Coordinates," Nov. 2, 2005, pp. 1-1, retrieved from the Internet: URL: http://groups.google.com/forum/#!msg/google-maps-api/wbuQ1SDAOqw/36r52orgKR4J [retrieved on Aug. 30, 2013].

Anonymous, "Add a Google Map on a Web Page," Oct. 18, 2008, pp. 1-2, retrieved from the Internet: URL: http://web.archive.org/web/20081018191805/http://www.scriptol.com/how-to/add-google-map.php [retrieved on Oct. 18, 2008].

Anonymous, "Google Maps API," Dec. 6, 2008, pp. 1-16, retrieved from the Internet: URL: http://web.archive.org/web/20081206061519/http://code.google.com/apis/maps/documentation/services.html [retrieved on Jun. 12, 2008].

"Office Action of European Counterpart Application", issued on Sep. 9, 2013, p. 1-p. 6.

\* cited by examiner

METHOD, APPARATUS, AND RECORDING MEDIUM FOR SELECTING LOCATION OF MOBILE DEVICE

CROSS-REFERENCE TO RELATED APPLICATION

This application claims the priority benefit of Taiwan application serial No. 98102325, filed on Jan. 21, 2009. The entirety of the above-mentioned patent application is hereby incorporated by reference herein and made a part of this specification.

BACKGROUND

With the continuous advancement and improvement of electronic technology and communication techniques, compact or portable electronic devices such as cellular phones, personal digital assistants (PDAs), PDA phones, car PCs, etc, are also evolving rapidly. The electronic devices in the market now have integrated a greater number of functions to increase their competitiveness. Other than the conventional functions of taking photos, making phone calls, and surfing the internet, the global positioning system (GPS), the electronic map, the navigation system are also integrated in a handheld communication device. Hence, a user can monitor his/her location through the electronic map and the GPS anytime. Also, by the planning and guiding of the navigation system, the route can be determined to reach the destination.

However, the GPS can only function in places with satellite signal reception. Once the user carries the GPS into a building or other places with satellite signal blockage, the positioning will not be proceeded correctly. Under such conditions, when the user needs to position his/her location, he/she can only position his/her location at a place with satellite signal reception, such as a window side, outdoors, etc. Thus, an alternative way must be provided as an option for the user to position his/her own location anytime and anywhere.

SUMMARY

The present application provides a method of selecting a location, in which the precise location of a mobile device may be obtained from an electronic map, a detected current location, or a location list.

The present application provides a method of selecting a location, in which a map around the current location is provided for a user to select the precise location.

The present application provides a system of selecting a location. By the positioning of a communication module, the system may display a map of a range around the user's location for the user to select so as to obtain the precise location.

The present application provides a method of selecting a location suitable for a mobile device. First, a first select signal is received, and location information, for example, the location information of a current position of the mobile device, is obtained from an electronic map, a detected current location, or a location list according to the first select signal. Next, a second select signal is received, and the location information is added to a document according to the second select signal and the document is sent to a remote device.

In one example of the present application, if obtaining the location information from the electronic map is selected, then the communication module is used to position the mobile device for obtaining a first location of the mobile device, in which the first location is an approximate location of the mobile device. Next, the electronic map of a range around the first location is displayed. Thereafter, a second location that is selected on the electronic map by the user is received, in which the second location is a precise location and used as the location information, such as the location information of the mobile device. Here, the communication module comprises a global system for mobile communication (GSM) system, a personal handy-phone (PHS) system, a code division multiple access (CDMA) system, a wireless fidelity (Wi-Fi) system, a radio repeater, or a radio broadcaster, etc.

In one example of the present application, if obtaining the location information from the detected current location is selected, then a positioning module is used to position the mobile device for obtaining a third location of the mobile device. The third location is then used as the location information of the current position of the mobile device. Herein, the positioning module is, for example, a global positioning system (GPS).

In one example of the present application, if obtaining the location information from the location list, for example, a known location list, is selected, then a location list is displayed, and a location selected from the location list is received and used as a fourth location. The fourth location is used as, for example, the location information of the current position of the mobile device.

In one example of the present application, the step of adding the location information to the document according to the second select signal comprises converting the location information to an address by using a reverse geocoding and adding the address to a document. In another example, the step may comprise filling the location information in the corresponding fields in a uniform resource locator (URL) address of a network electronic map and adding the URL address to the document.

In one example of the present application, after the step of sending the document to the remote device, the remote device may read the URL address in the document, and connect to the URL address on the internet, so as to display the network electronic map.

In one example of the present application, a format of the above-mentioned document comprises an e-mail, a short message service (SMS), a multimedia messaging service (MMS), a file, a keyhole Markup Language (KML), a Keyhole Markup Zip file (KMZ), a hypertext markup language (HTML), and a special format such as a vCard-like format that is similar to a vCard format and a virtual postcard format, etc. The aforementioned location information comprises a latitude/longitude coordinate, a map, or an address.

The present application provides a method of selecting a location suitable for a mobile device. First, the mobile device is positioned by using a communication module for obtaining a first location of the mobile device, in which the first location is an approximate location of the mobile device. Next, an electronic map of a range around the first location is displayed. Thereafter, a second location is obtained by receiving a select signal on the electronic map, in which the second location is a precise location and used as location information, such as the location information of the mobile device. Here, the communication module comprises a GSM system, a PHS, a CDMA system, a Wi-Fi system, a radio repeater, or a radio broadcaster.

In one example of the present application, before the step of positioning the mobile device by using the communication module for obtaining the first location of the mobile device, a positioning module is utilized to position the mobile device for obtaining a third location of the mobile device and then the third location is used as the location information of the mobile device. The positioning module is, for example, a GPS.

In one example of the present application, before the step of positioning the mobile module by using the communication module for obtaining the first location of the mobile device, a location list is further displayed and a location selected on the location list by the user is received and used as a fourth location. The location is used as, for example, the location information of the mobile device.

The present application provides a system of selecting a location which is suitable for being disposed in a mobile device. The system comprises a display unit, a communication module, an electronic map module, an input unit, and a control unit. The communication module is used to position the mobile device for obtaining a first location of the mobile device, in which the first location is an approximate location of the mobile device. The electronic map module is used to display an electronic map of a range around the first location on the display unit. The input unit is used to receive a select signal. The control unit is used to select a second location on the electronic map according to the select signal, in which the second location is a precise location. The second location is used as, for example, the location information of the mobile device. Here, the communication module comprises a GSM system, a PHS, a CDMA system, a Wi-Fi system, a radio repeater, or a radio broadcaster.

In one example of the present application, the system further comprises a positioning module that positions the mobile device for obtaining a third location of the mobile device. The control unit then further selects the third location as the location information of the mobile device according to the select signal. The positioning module is, for example, a GPS.

In one example of the present application, the system further comprises a location list module that displays a location list on the display unit. The control unit further selects a location on the location list as a fourth location according to the select signal. Afterward, the position is used as, for example, the location information of the current position of the mobile device.

In example of the present application, the communication module further sends the location information of the mobile device to a remote device. The communication module also adds the location information to a document according to the select signal and sends the document to the remote device.

In one example of the present application, the control unit further converts the location information to an address by using a reverse geocoding, and adds the address to the document. In another example, the control unit may further fill the location information in the corresponding fields in a URL address of a network electronic map, and adds the URL address to the document.

The present application provides a recording medium which records program signals to be loaded into a mobile device to execute following steps. First, a first select signal is received, and location information, for example, the location information of a current position of the mobile device, is obtained from an electronic map, a detected current location, or a location list according to the first select signal. Next, a second select signal is received, and the location information is added to a document according to the second select signal and the document is sent to a remote device.

In light of the foregoing, the method, the apparatus, and the recording medium of selecting the location in the present application obtain location information, that is, precise location information of the mobile device, by selecting from an electronic map, a detected current location, or a location list. In addition, the present application selectively adds the location information to the documents in the HTML format or other special formats, such as vCard-like format, so as to allow the remote user to open the document with related programs to obtain the current location of the mobile device.

In order to make the aforementioned and other features and advantages of the present application more comprehensible, several examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION OF EXAMPLES

Except for global positioning system (GPS), which may be used to estimate a precise location of a mobile device, signals of various communication systems may also be used to estimate an approximate location of the mobile device. The communication system comprises, for example, a global system for mobile communication (GSM) system, a personal handy-phone system (PHS), a code division multiple access (CDMA) system, a wireless fidelity (Wi-Fi) system, a radio repeater, or a radio broadcaster, etc. The present application first obtains the approximate location of the mobile device by the positioning of the communication system, and displays a map around the location on the mobile device. Subsequently, a user selects the desired precise location, for example, the precise location of his/her whereabouts, directly on the map. Accordingly, the present application allows the user to obtain the location information as needed when he/she is in a building or other places with blockage, and share the location information with other uses at a remote end.

Figure 1:
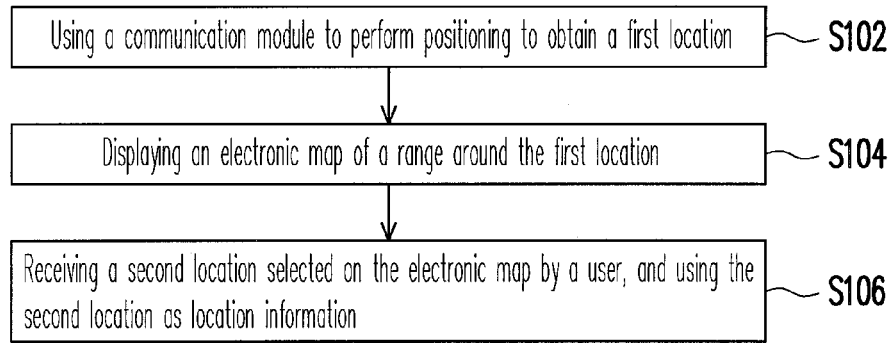
FIG. 1 is a flowchart showing a method of selecting a location according to an example of the present application.

FIG. 1 is a flowchart showing a method of selecting a location according to an example of the present application. Referring to FIG. 1, the present example is suitable for mobile devices such as cell phones, smart phones, PDAs, PDA phones, media players, game devices, notebooks, navigation devices, or car PCs, etc, to obtain location information of the mobile device, such as a latitude-longitude coordinate, or an address. The steps of the method are illustrated in the following.

First, the mobile device performs the positioning by using a communication module to obtain a first location (Step S102). The first location is an approximate location of the mobile device. In detail, the communication module estimates a current position of the mobile device by, for example, detecting the signal strength of base stations of communication vendors and referring to geographical locations of the base stations. As the signals of the base stations are possibly influenced by blockage of buildings or transmission distances, the location estimated by the communication module may not be precise. However, at least the approximate location of the mobile device on a map can be obtained. Here, the communication module comprises a GSM system, a PHS, a CDMA system, a Wi-Fi system, a radio repeater, or a radio broadcaster, etc.

After the first location of the approximate position of the mobile device is obtained, an electronic map of a range around the first location is displayed on a screen of the mobile device (Step S104). The range is determined by, for example, a scale of the electronic map. Usually, an electronic map with a radius of less than about 3 km is utilized to clearly label all the street names and landmarks around the first location and allows a user to browse and select his/her location.

Next, the mobile device receives a second location selected on the electronic map by the user. The second location is a precise location and set as location information, for example, the location information of the mobile device (Step S106). In detail, since only the user knows where he/she is located on the map, when the GPS positioning can not function, the most accurate way is to show an interface for the user select to his/her location. By the method of selecting the location in the present application, the electronic map around the current location of the user may be presented to the user in the fastest rate and the best proportion scale. The user only needs to pick a location or select a landmark, an intersection, or even a house number on the electronic map, and the mobile device may automatically set the selected point as the location information of the mobile device so as to achieve the precise positioning function of the GPS.

In one example, the method of selecting the location may incorporate with the GPS to select location information of the mobile device. For example, before the positioning is performed by using the communication module, the GPS may firstly be used to detect satellite signals. If the satellite signals are strong enough for positioning, a latitude-longitude coordinate obtained from the GPS positioning may be used directly as the location information of the mobile device.

In another example, the method of selecting the location may also incorporate with a location list to obtain the location information of the mobile device. The user may set up and collect his/her favorite or often-visited locations such as restaurants and scenic spots as points of interest (POIs) to establish a location list in a manner similar to a contact list. Here, besides names and locations of the POIs, other information such as photos, addresses, and telephone numbers of the POIs may also be recorded. When the user is located at one of the locations in the location list, he/she only needs to select the location from the location list, and the mobile device will automatically set the location of the selected location as, for example, the location information of the current position, the location information of the place to meet up, or the location information to be sent to another user.

By the method of selecting the location of the application, the mobile device may automatically select the location by using suitable method according to the settings, or select the location according to an instruction of the user. After the location information is obtained, the mobile device may further add the location information to a document and send the document to a remote device. Hence, a remote user may receive, for example, the current location of the user or the place to meet up. The following illustrates another example of the present application.

Figure 2:
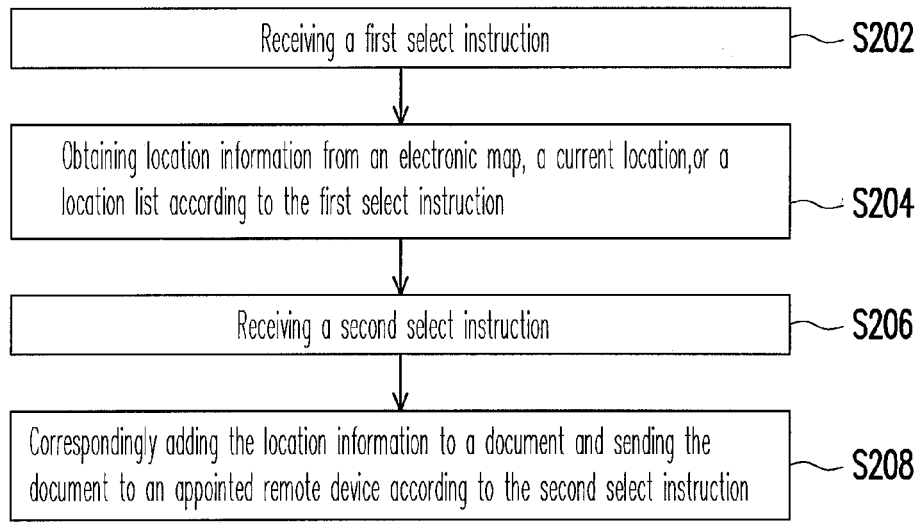
FIG. 2 is a flowchart showing a method of selecting a location according to an example of the present application.

FIG. 2 is a flowchart showing a method of selecting a location according to an example of the present application. Referring to FIG. 2, the present example is suitable for mobile devices, such as cell phones, smart phones, PDAs, PDA phones, media players, game devices, notebooks, navigation devices, or car PCs, etc, to obtain location information of the mobile device and send the location information to a remote device. The steps of the method are illustrated in the following.

First, the mobile device receives a first select signal (Step S202), and obtains location information, for example, the location information of a current position of the mobile device, from an electronic map, a detected current location, or a location list according to the first select signal (Step S204). When a user activates a function of selecting the location, the mobile device may display a plurality of options on a screen for the user to select the method of selecting the location, and execute the location selection method according to the option selected by the user.

In detail, if the mobile device receives the select signal of selecting the location by selecting from the electronic map, then a communication module therein is used to perform the positioning for obtaining an approximate location of the current position. Next, according to the approximate location, an electronic map of a range around the current location is displayed on the screen. Finally, the location selected on the electronic map by the user is detected so that a latitude-longitude coordinate or an address of the location is set as location information, for example, the current location information of the mobile device or the location information of the POI.

In another example, if the mobile device receives the select signal of selecting the location from the detected current location, then a positioning module therein, for example a GPS system, is activated to perform the positioning for obtaining a precise location of the current position. Thus, the precise location is directly used as the current location information of the mobile device or the location information of the POI.

Moreover, if the mobile device receives the select signal of selecting the location from the location list, then a location list is displayed on the screen. The location list comprises the location information of a plurality of locations, and the user may select one location of the location list, such that a latitude-longitude coordinate or an address of the location is set as the location information, for example, the location information of the mobile device.

Figure 3:
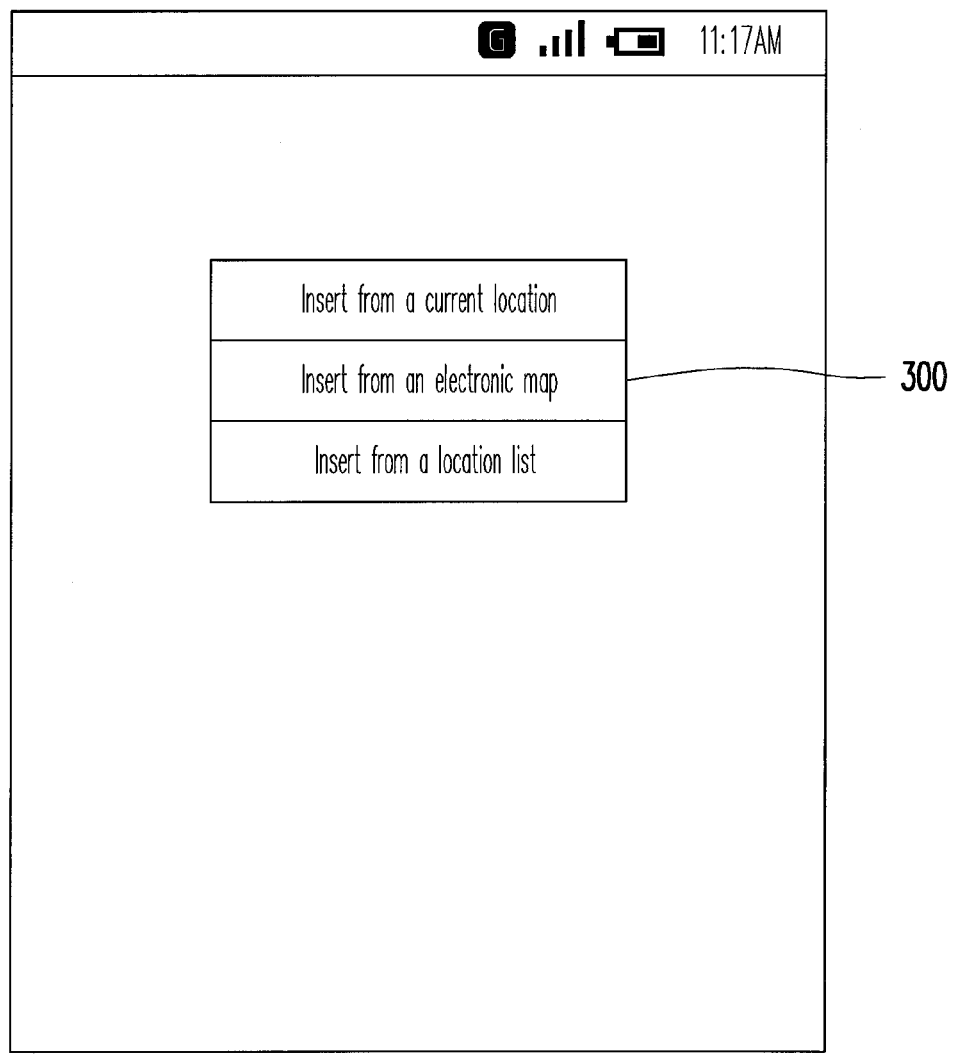
FIG. 3 shows a user interface of a method of selecting a location according to an example of the present application.

For example, FIG. 3 shows a user interface of a method of selecting a location according to an example of the present application. Referring to FIG. 3, when the user needs to select a location, he/she may activate a function of selecting the location in the user interface of a mobile device. The mobile device displays a location selecting function menu 300 in the user interface so that the user may select needed location information from an electronic map, a detected current location, or a location list.

Figure 4:
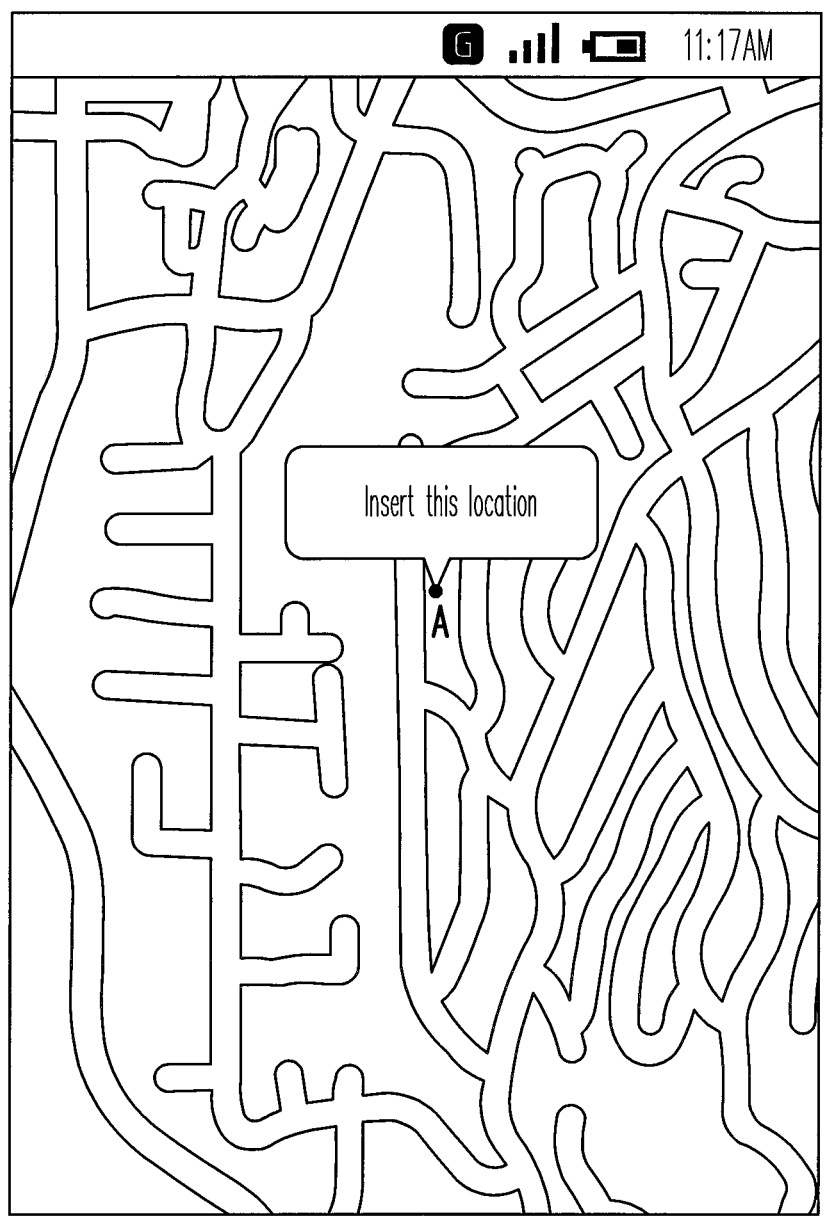
FIG. 4 shows a user interface of selecting a location by inserting from an electronic map according to an example of the present application.

FIG. 4 shows a user interface of selecting a location by inserting from an electronic map according to an example of the present application. Referring to FIG. 4, when a user selects an option of "Insert from an electronic map" in the menu 300, the mobile device then performs the positioning by using a communication module therein and displays an electronic map 400 within a range around the current location on a screen, for example, a map with a specific scale, a map with a specific radius around the current location, etc. The user selects a location A on the electronic map 400, and then the mobile device displays a dialogue box of "Insert this location." At this time, the user may select the location of the location A as location information, for example, the location information of the mobile device, by selecting the dialogue box.

Figure 5:
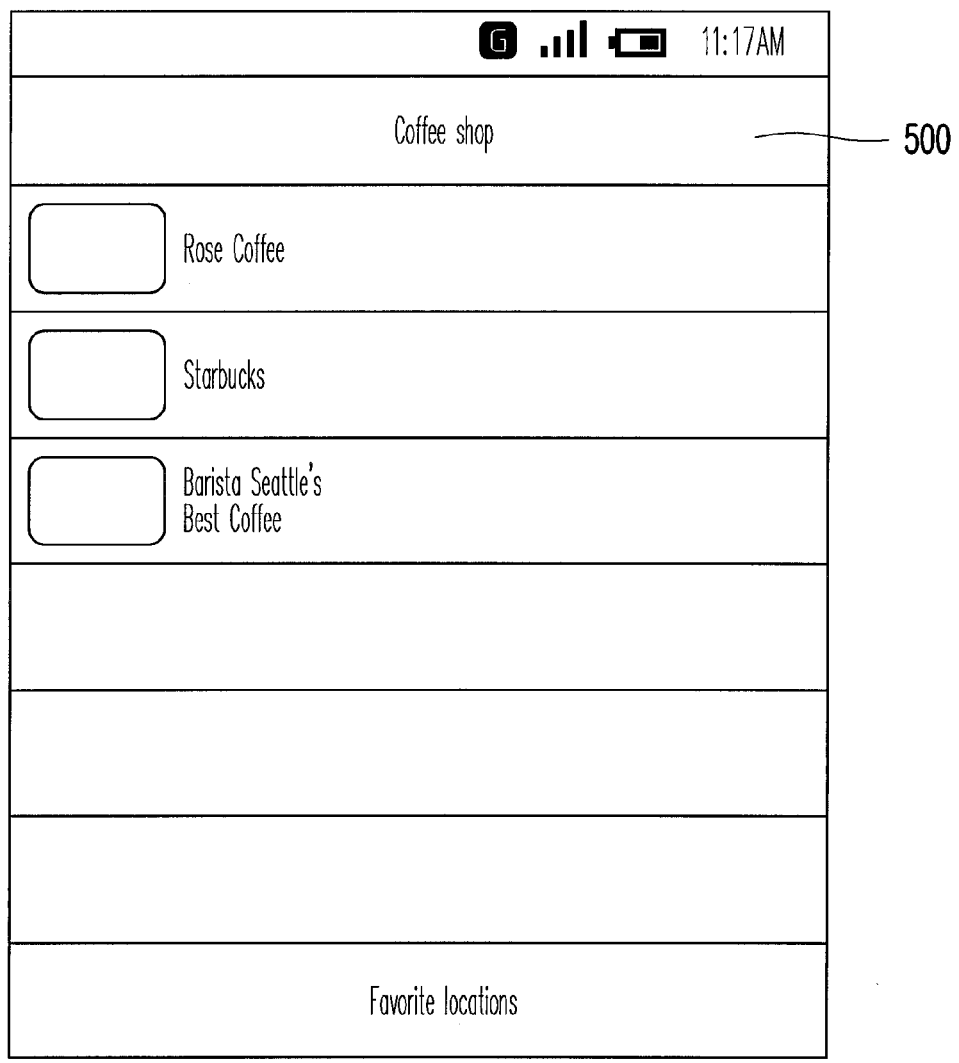
FIG. 5 shows a user interface of selecting a location by inserting from a location list according to an example of the present application.

FIG. 5 shows a user interface of selecting a location by inserting from a location according to an example of the present application. Referring to FIG. 5, when a user selects an option of "Inserting from a location list" in the menu 300, the mobile device then displays a location list, for example, a coffee shop list 500, to list out coffee shops that are already saved and/or frequently visited by the user. Here, the user may select one of the coffee shops as location information. For example, if the user is in one of the coffee shops, then he/she may select the coffee shop as the location information of the mobile device.

Through the aforesaid three methods of selecting the location, precise location information can be obtained. At this time, the mobile device further receives a second select signal (Step S206), and adds the location information obtained previously to a document according to the second select signal and sends the document to an appointed remote device (Step S208). Specifically, the mobile device can determine a type of the location information to be inserted in and a format of the document to be inserted according to the demand of the user or the type of the remote device. Herein, the type of the location information comprises a latitude-longitude coordinate, an address, or an introduction of a POI, etc. The format of the document comprises an e-mail, a short message service (SMS), a multimedia messaging service (MMS), a file, a keyhole Markup Language (KML), a Keyhole Markup Zip file (KMZ), a hypertext markup language (HTML), and a special format such as a vCard-like format that is similar to a vCard format and a virtual postcard format, etc.

For example, the mobile device may convert the latitude-longitude coordinate into an address by using a reverse geocoding, and then add the address to the document. In detail, the mobile device may send the latitude-longitude coordinate of the current location to a location server on a network and inquire an actual address corresponding to the latitude-longitude coordinate. Thereafter, the address is added to the e-mail or the SMS to be sent to a remote contact.

In one example, in order to enable the contact of the remote device to directly select the document sent by the mobile device so as to see the actual location of the selected location information, for example the current location of the user, on the electronic map, the mobile device of the present example further comprises finding the fields (e.g. the latitude-longitude coordinate) in the uniform resource locator (URL) address of a network electronic map that are corresponding to the location information. Afterward, the selected location information is transformed and filled in these fields, such that the URL address filled in with the location information can be used to connect to a website of the network electronic map when being selected. Accordingly, when the user of the remote device receives the e-mail or the SMS including this URL address or text, a icon, or a image with a link to the URL address, the user only needs to click on the URL address or the text, icon, or image and then the mobile device connects to the URL address on the internet automatically and displays the network electronic map.

Similarly, the mobile device also may use the same method to add the location information to different format documents such as an e-mail, a SMS, a MMS, a file, a KML/KMZ, a HTML, and a special format such as a vCard-like format that is similar to a vCard format and a virtual postcard format, etc.

Hence, the remote contact may obtain the location information sent by the user, for example, the location information of the user's current location.

Figure 6:
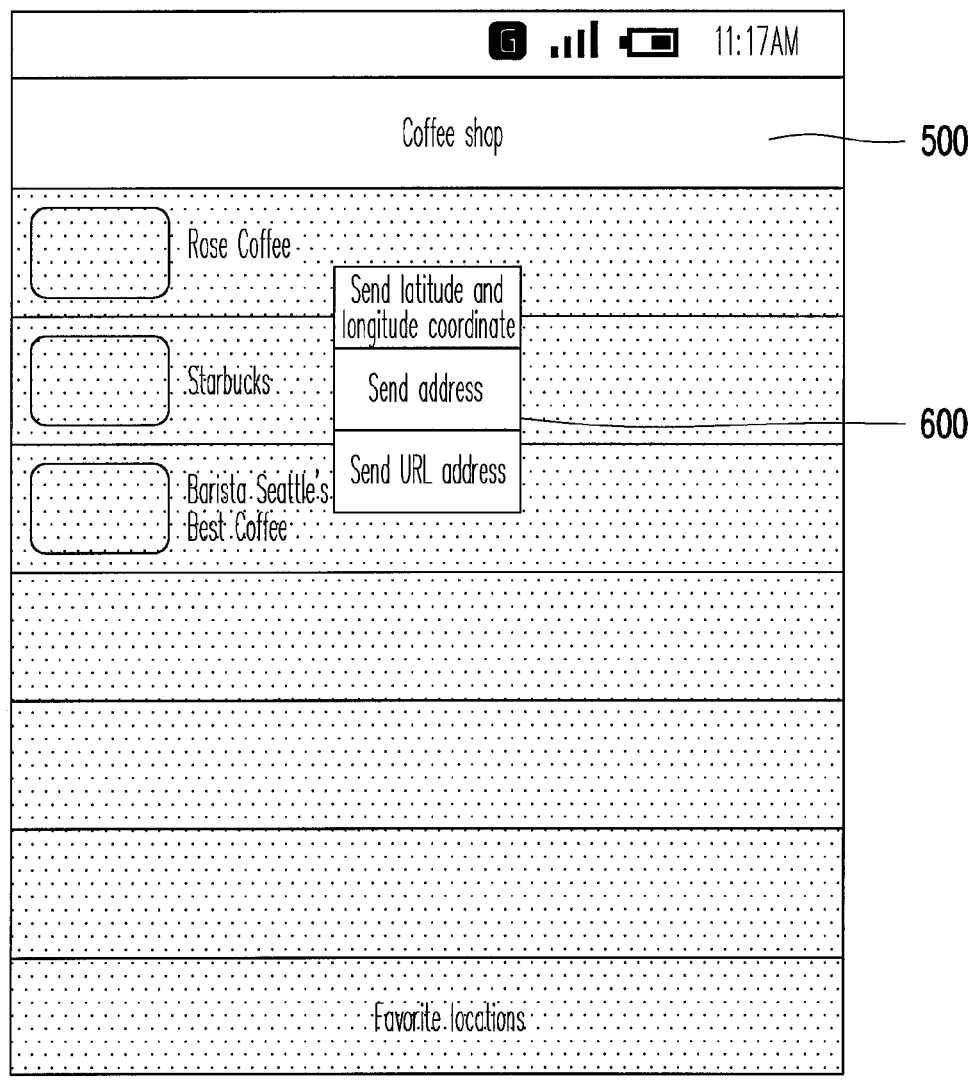
FIG. 6 shows a user interface for selecting location information type according to an example of the present application.

For example, FIG. 6 shows a user interface for selecting location information type according to an example of the present application. Referring to FIG. 5 and FIG. 6 simultaneously, when a user selects a coffee shop in FIG. 5, the mobile device then sets a location of the coffee shop as location information, for example, the location information of the mobile device. Then, the mobile device displays a location information type menu 600, for example on a top layer of the coffee shop list, for the user to choose for sending the location information in a format of a latitude/longitude coordinate, an address, or a URL address.

In addition, for the location selecting method aforementioned, the present application also provides a hardware device, so that the method can be applied in mobile devices such as cell phones, smart phones, PDAs, or PDA phones, media players, game devices, notebooks, navigation devices, or car PCs. Another example is illustrated in the following.

Figure 7:
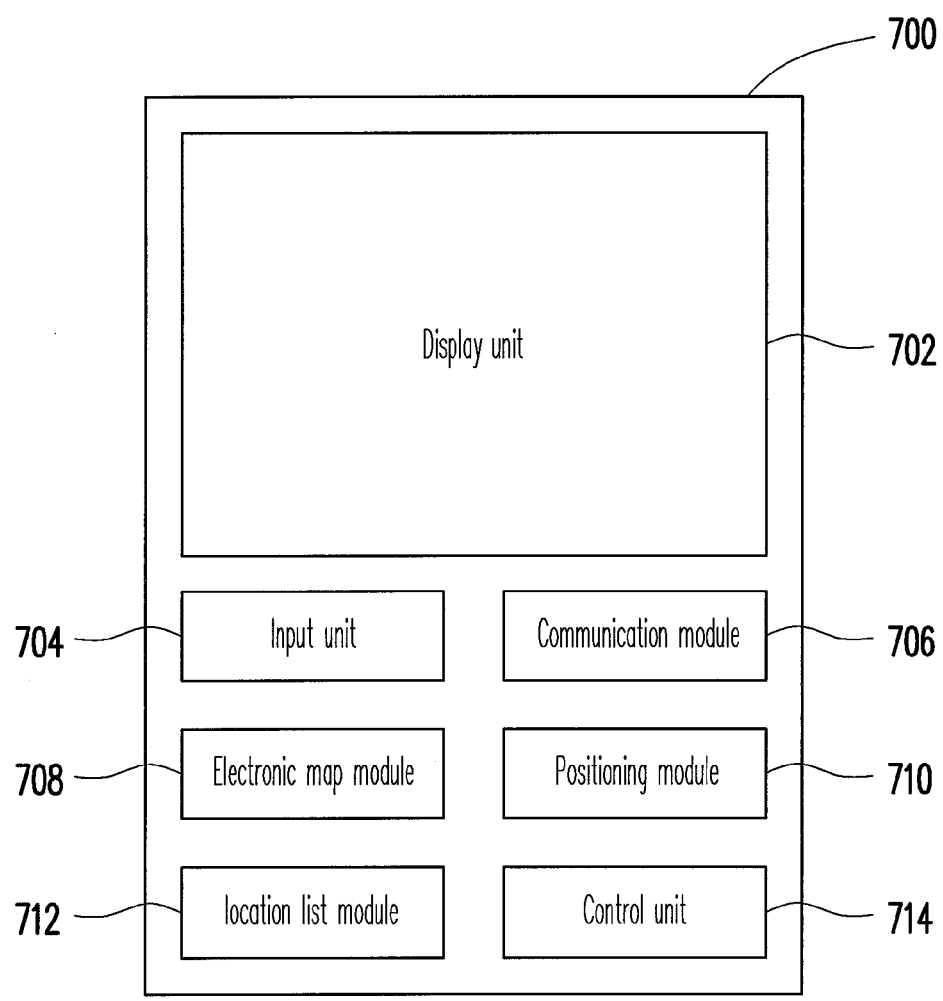
FIG. 7 shows a block diagram of a system of selecting a location according to an example of the present application.

FIG. 7 shows a block diagram of a system of selecting a location according to an example of the present application. Referring to FIG. 7, a location selecting system 700 of the present example comprises a display unit 702, an input unit 704, a communication module 706, an electronic map module 708, a positioning module 710, a location list module 712, and a control unit 714. The function thereof is illustrated as follows.

The display unit 702 is, for example, a liquid crystal display (LCD), which is used to display a user interface of the mobile device. The input unit 704 is, for example, a keypad or a touch pad disposed on the mobile device, or is integrated with the display unit 702 to form a touch panel. The input unit 704 can receive a select signal of the user for operating the user interface displayed on the display unit 702.

The communication module 706 is, for example, a device which connects communication systems such as a GSM communication system, a PHS, a CDMA system, a Wi-Fi system, a radio repeater, or a radio broadcaster, etc. The communication module 706 is used to position the mobile device to obtain a first location, which is an approximate position of the current position of the mobile device.

The electronic map module 708 displays an electronic map of a range around the first location on the display unit 702 according to the first location obtained from the positioning of the communication module 706. Then, the control unit 714 selects a second location on the electronic map and sets the second location as location information, for example, the location information of the mobile device, according to a select signal which is made by the user and received by the input unit 704.

The positioning module 710 is, for example, a GPS system, and is used to position the mobile device to obtain a third location of the mobile device. In addition, the control unit 714 selects the third location as location information, for example, the location information of the mobile device, according to the select signal which is made by the user and received by the input unit 704.

The location list module 712 is used to display a location list on the display unit 702. The location list module 712 comprises the location information of a plurality of locations. The control unit 714 selects a location in the location list and set the location as a fourth location according to a select signal which is made by the user and received by the input unit 704. The fourth position is used as location information, for example, the location information of the mobile device.

In one example, after the location information is selected by the electronic map module 708, the positioning module 710, or the location list module 712, the control unit 714 may further establishes a new location in the location list and uses the selected location information to be the location information of the new location.

Furthermore, after the location information is selected by the electronic map module 708, the positioning module 710, or the location list module 712, the control unit 714 may further add the location information to a document and send the document to a remote device by the communication module 706, wherein the format of the document is according to the select signal which is made by the user and received by the input unit 704, such that a remote contact may know the current location of the user.

For example, the control unit 714 converts the location information to an address by using a reverse geocoding, and then inserts the address into the document, or fills the location information in a plurality of corresponding fields in a URL address of a network electronic map and then inserts the URL address or text, a icon, or a image with a link to the URL address into the document. It should be noted that a format of the document may be any one of an e-mail, a SMS, a MMS, a file, a KML/KMZ, a HTML, or a special format such as a vCard-like format that is similar to a vCard format and a virtual postcard format, etc., but the present example is not limited therein.

The present application further provides a recording medium which records a computer program to be loaded into a mobile device to execute the location selecting method described above. The computer program is composed of a plurality of program segments (for example, an organization chart establishing program segment, an approval form program segment, a setting program segments, and a deployment program segment). The program segments are loaded into the mobile device and executed by the same to accomplish the location selecting method and the functions of the location selecting apparatus described above.

In summary, the method, the apparatus, and the recording medium for selecting the location obtain an approximate location of the mobile device and display an electronic map around the mobile device for the user to select. Therefore, the user may select the precise location indoors. Furthermore, the user may also build a location list and/or share his/her location with other remote contacts. Additionally, by incorporating the methods of inserting location information from the detected current location or the location list, the present application may provide the user with diverse methods to select the location information.

Although the present application has been described with reference to the above examples, it will be apparent to one of the ordinary skill in the art that modifications to the described example may be made without departing from the spirit of the application. Accordingly, the scope of the application will be defined by the attached claims not by the above detailed descriptions.

What is claimed is:

1. A method of fine-tuning a current location and transmitting the fine-tuned current location, applicable to a mobile device, the method comprising:
   obtaining a first location of the mobile device by using a communication module to estimate a current location of the mobile device, wherein the first location is approximately the current location;
   displaying an electronic map of a specific range around the first location on a display unit, and by using a processor in the mobile device, the electronic map provides a selection function to manually select a second location which represents a fine-tuned current location within the specific range around the first location on the displayed electronic map;
   receiving a select signal on the electronic map from an input unit for selecting the second location displayed on the electronic map through the selection function as the fine-tuned current location; displaying on the electronic map an indicator showing the fine-tuned current location;
   and
   adding, by using the processor in the mobile device, the selected second location which is a fine-tuned current location and transmitting a document comprising the selected second location.

2. The method as claimed in claim 1 further comprising adding the selected second location into the document;
   converting the selected second location to an address by using a reverse geocoding; and inserting the address into the document.

3. The method as claimed in claim 2, wherein the step of adding the selected second location into the document comprises:
   inserting the selected second location into the fields in a URL address of a network electronic map, and adding the URL address to the document.

4. The method as claimed in claim 3, wherein the URL address added to the document is used for the remote device to connect the URL address on an internet and display the network electronic map.

5. The method of claim 1, wherein the mobile electronic device further comprising a recording medium having a plurality of commands executable on a handheld electronic device for executing the method of claim 1.

6. The method as claimed in claim 1, wherein a format of the document comprises an e-mail, a short message service (SMS), a multimedia messaging service (MMS), a file, a keyhole Markup Language (KML), a Keyhole Markup Zip file (KMZ), a hypertext markup language (HTML), and a special format comprising a vCard-like format and a virtual postcard format.

7. The method of claim 1, wherein the communication module comprising a global positioning satellite (GPS) receiver which is used to obtain the first location.

8. A mobile electronic device, comprising:
   a display unit;
   a communication module configured to obtain a first location of the mobile device which is an estimated current location of the mobile device;
   an electronic map module configured to display an electronic map of a specific range around the first location on the display unit, and the electronic map provides a selection function for a user to manually select a second location which is a fine-tuned current location within the specific range around the first location on the displayed electronic map; and the electronic map displays an indicator showing the fine-tuned current location
   an input unit configured to receive a selection of the second location on the displayed electronic map; and
   a control unit electrically coupled to the display unit, the communication module, the electronic map module, the input unit, and is configured to define the selected second location as the fine-tuned current location on the displayed electronic map and, to transmit a document comprising the fine-tuned current location by using the communication module.

9. The device as claimed in claim 8, wherein the control unit further fills the selected second location in the fields in a URL address of a network electronic map, and adds the URL address into the document.

10. The device as claimed in claim 8, wherein a format of the document comprises an e-mail, a short message service (SMS), a multimedia messaging service (MMS), a file, a keyhole Markup Language (KML), a Keyhole Markup Zip file (KMZ), a hypertext markup language (HTML), and a special format comprising a vCard-like format and a virtual postcard format.

* * * * *